United States Patent
Sakhare et al.

(10) Patent No.: US 8,960,774 B2
(45) Date of Patent: Feb. 24, 2015

(54) IMPACT ABSORBING BODY FOR A VEHICLE DOOR TRIM

(71) Applicants: Nilesh Ishwardas Sakhare, Yokohama (JP); Toru Ishizaki, Fujisawa (JP); Yoshiyuki Arai, Yokohama (JP)

(72) Inventors: Nilesh Ishwardas Sakhare, Yokohama (JP); Toru Ishizaki, Fujisawa (JP); Yoshiyuki Arai, Yokohama (JP)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 13/955,695

(22) Filed: Jul. 31, 2013

(65) Prior Publication Data

US 2014/0035322 A1     Feb. 6, 2014

(30) Foreign Application Priority Data

Jul. 31, 2012  (JP) ................................. 2012-169969

(51) Int. Cl.
*B62D 25/02* (2006.01)
*B60R 21/04* (2006.01)
*B60J 5/04* (2006.01)

(52) U.S. Cl.
CPC ............ *B62D 25/02* (2013.01); *B60R 21/0428* (2013.01); *B60J 5/0451* (2013.01)
USPC .............. 296/187.12; 296/187.05; 296/146.7; 280/748

(58) Field of Classification Search
CPC ...... B60J 5/0412; B60J 5/0413; B60J 5/0451; B60R 21/0428; B62D 25/02
USPC ............. 296/1.04, 146.1, 146.7, 152, 187.03, 296/187.05, 187.12, 191; 280/748
See application file for complete search history.

(56) References Cited

U.S. PATENT DOCUMENTS

| | | | | |
|---|---|---|---|---|
| 5,806,889 A | * | 9/1998 | Suzuki et al. | 280/748 |
| 5,934,730 A | * | 8/1999 | Yagishita et al. | 296/39.1 |
| 6,036,251 A | * | 3/2000 | Yagishita et al. | 296/39.1 |
| 6,080,463 A | * | 6/2000 | Togawa et al. | 428/120 |
| 8,011,717 B2 | | 9/2011 | Endo et al. | |
| 2008/0012384 A1 | * | 1/2008 | Sielhorst et al. | 296/146.7 |
| 2009/0250966 A1 | * | 10/2009 | Suzuki et al. | 296/146.6 |
| 2010/0259069 A1 | * | 10/2010 | Suzuki et al. | 296/187.12 |

FOREIGN PATENT DOCUMENTS

| | | |
|---|---|---|
| CA | 2656902 A1 | 9/2010 |
| CN | 101850751 A | 10/2010 |
| EP | 2 223 829 A1 | 9/2010 |
| JP | 2004 090852 | 3/2004 |
| JP | 2004338627 A | 12/2004 |

(Continued)

*Primary Examiner* — Glenn Dayoan
*Assistant Examiner* — Jason S Daniels
(74) *Attorney, Agent, or Firm* — Dickinson Wright PLLC

(57) ABSTRACT

An impact absorbing body for attachment to a door trim is capable of bearing a collision load from an exterior panel at the time of a side collision. The impact absorbing body has a top face portion with linear edge portions and sidewall portions extending from the linear edge portions toward the door trim to provide a hollow box. The impact absorbing body also includes base portions connected to edge portions of the sidewall portions. The base portions are open toward the door trim and are attached to the door trim. The impact absorbing body also includes slits between adjacent sidewall portions, and the sidewall portions have outwardly slanted portions. In addition, rib members extend from the top face portion toward the base portion, toward the inside of the hollow box, and connect the adjacent sidewall portions.

20 Claims, 10 Drawing Sheets

(56) References Cited

FOREIGN PATENT DOCUMENTS

| | | |
|---|---|---|
| JP | 2009 012559 | 1/2009 |
| JP | 2009 012560 | 1/2009 |
| JP | 4218879 A | 2/2009 |
| JP | 2010 107027 | 5/2010 |
| MX | 2009002532 A | 9/2010 |

\* cited by examiner

IMPACT ABSORBING BODY FOR A VEHICLE DOOR TRIM

CROSS REFERENCE TO RELATED APPLICATIONS

This U.S. utility patent application claims priority to Japanese Patent Application Number 2012-169969 filed Jul. 31, 2012 entitled "Vehicle Impact Absorbing Body and Vehicle Interior Component Having the Same", the entire disclosure of this application being considered part of the disclosure of this application and hereby incorporated by reference.

BACKGROUND OF THE INVENTION

1. Field of the Invention

The present invention relates to a vehicle impact absorbing body and, in particular, an impact absorbing body for vehicle occupant protection provided between a vehicle external panel and door trim.

2. Description of the Prior Art

Vehicle interior components that are provided in, for example, vehicle doors, and the like, are structured to protect a vehicle occupant by absorbing the impact load and reducing the load placed on the vehicle occupant. For example, the vehicle interior components can flex or deform when an impact load from the side of the vehicle is applied during a side collision, such as when the vehicle is struck in the side by another vehicle, or the like.

Japanese Unexamined Patent Application Publication 2009-161028 (hereinafter the "JP '028 patent application") discloses an impact absorbing body that is able to provide stabilized impact absorbing performance through the formation of recessed ribs on the sidewall of a hollow structure made from thermoplastic resin, as an energy absorbing body for protecting, primarily, the hips and shoulders of a vehicle occupant from the collision.

Japanese Unexamined Patent Application Publication 2004-090852 (hereinafter the "JP '852 patent application") discloses an impact absorbing structure configured to absorb the collision energy efficiently, through the provision of a thin-walled portion in the sidewall of a cylindrical portion made from a resin molding.

Japanese Unexamined Patent Application Publication 2009-012559 (hereinafter the "JP '559 patent application") discloses an impact absorbing body including a hollow box unit made from resin, so as to absorb an impact through buckling and deforming during a side collision. This impact absorbing body of the JP '559 patent application is formed with a corner cut portion at a corner portion between a top face wall and two side face walls and also with interior ribs, so as to suppress a steep increase in the reaction force at an early stage of the collision, and so that there will be no excessive reduction in the reaction force in the latter half of the impact.

SUMMARY OF THE INVENTION

In recent years, various vehicle manufacturers, for each individual vehicle model, have established impact absorption characteristics (specifications such as the total amount of energy absorbed by an impact absorbing body, the load characteristics in regard to the amount of deformation, and the like) of respective impact absorbing bodies, at the time of a side collision. They have established impact absorption characteristics for each installation location on the door trim, envisioning collisions with the hips and shoulders of the vehicle occupants, so as to satisfy specific collision safety standards. In order to produce these desired impact absorption characteristics, it is necessary for the design of the impact absorbing body to consider space constraints between the exterior panels and the door trim, the locations of attachments to the door trim, and the like, which vary between the vehicle models.

However, in the conventional technologies mentioned above, it is difficult to satisfy all of the specifications and constraints on the impact absorbing bodies for each of the attachment positions in each of the vehicle models, established by the vehicle manufacturers. Thus, there remains a need for new structures for impact absorbing bodies, with higher design generalizability and ability to reliably satisfy the required impact absorption characteristics desired.

The present invention solves the problem areas set forth above and provides an impact absorbing body effectively able to produce desired impact absorption characteristics and protect a vehicle occupant. In order to achieve the object set forth above, the impact absorbing body according to the present invention is provided between an exterior panel of a vehicle and door trim that is attached to the exterior panel. The impact absorbing body is provided at a location wherein, at the time of a side collision, a hip or shoulder of an occupant within the vehicle cabin can collide with the door trim. The impact absorbing body includes a hollow box having a top face portion formed to bear a collision load from the exterior panel at the time of a side collision. The top face portion has at least four linear edge portions. A plurality of sidewall portions extend from the individual linear edge portions of the top face portion toward the door trim, and base portions extend in the sideways directions from the individual edge portions, on the door trim side, of these sidewall portions, formed so as to bear, together with the individual edge portions, a collision load of a vehicle occupant colliding with the door trim at the time of a side collision. The base portions surround an opening portion, which opens toward the door trim. A portion of the base portions of the impact absorbing body is attached to the door trim. Further, in the impact absorbing body, at least two slits extending from the base portions are formed at the boundary portions of adjacent sidewall portions of the plurality of sidewall portions. The sidewall portions of the impact absorbing body have slanted portions that are slanted toward the outside in the sideways direction. The impact absorbing body also has at least two rib members that extend toward the base portion from the top face portion in the inside of the hollow box and that extend so as to connect adjacent sidewall portions together.

At the early stage of a collision (the early stage wherein the impact absorbing body has received the collision load), fractures are produced in the boundary portion of adjacent sidewall portions by the slits, and as the fracturing advances, each sidewall portion is enabled, through the existence of the slanted portions, to effectively deform so as to open in the sideways direction. This enables the collision energy of the early stage of the collision to be absorbed. Moreover, it is possible to adjust, through the rib members connecting adjacent sidewall portions, the amount of collision energy that is absorbed, in the middle stage of the collision in particular. The amount of collision energy can be adjusted by adjusting the degree of opening deformation of the sidewall portions, as described above. Moreover, the deformation of the rib members themselves can absorb the collision energy in the middle stage of the collision and the late stage of the collision. The amount of collision energy absorbed through the opening deformation of the sidewall portions, as described above, the amount of adjustment, by the rib members, in the degree of opening deformation, and the amount of absorption of the collision energy through deformation of the rib members themselves can be adjusted. This can include optimizing the thicknesses and heights of the individual sidewall portions and the rib members, the slant angles of the slanted portions of the sidewall portions, and the like, so as to produce the desired impact absorption characteristics through coordination in advance, specifically, through testing and analysis in the design stage. Consequently, it is possible to produce the desired impact absorption characteristics effectively throughout the early stage, middle stage, and late stage of the collision.

Preferably, each slit is shaped as a triangle, and the apex thereof is positioned at a specific height position along a boundary portion between adjacent sidewall portions. The triangular shape of the slits enables fracturing at the boundary portion of adjacent sidewall portions. Moreover, the impact absorption characteristics of the early stage of the collision can be adjusted by adjusting, in advance, the height position from the base portion of the slit (a specific height position).

Preferably, the plurality of sidewall portions have first sidewall parts that extend, to a specific height position, from the top face portion toward the door trim in an essentially perpendicular direction, and second sidewall parts that are the slanted portions and extend from the specific height position to the base portions.

The height-direction length of a first sidewall part of the sidewall portion (the distance from the top face portion to the specific height position) and the height-direction length of a second sidewall part, which is a slanted portion (the distance from the specific height to the base portions) can be adjusted in advance to produce desired impact absorption characteristics through adjusting the amount of collision energy absorbed through the opening deformation of the sidewall portion from the early stage of the collision.

In one embodiment, the slanted portions of the sidewall portions extend from the top face portion to the base portions, and thus the sidewall portion can perform, more effectively, so as to open toward the sideways direction.

Preferably, each rib member has a first rib part that extends toward the inside of the hollow box from one sidewall portion of mutually adjacent sidewall portions, a second rib part that extends toward the inside of the hollow box from the other sidewall portion of the mutually adjacent sidewall portions, and a third rib part that extends so as to connect the first rib part and the second rib part together.

The respective thicknesses, heights, and widths of the first rib parts, the second rib parts, and the third rib parts can be adjusted in advance to adjust the amount of absorption of collision energy by the opening deformation of the sidewall portion. The rib parts can also be adjusted to adjust the degree of opening deformation, thereby making it possible to obtain the desired impact absorption characteristics.

Preferably, the rib member extends from the top face portion to a specific height position to form a specific gap between the edges thereof, on the base portion side, and the base portion. Adjusting the height position of the base-portion-side edges of the rib members in advance makes it possible to adjust the amount of collision energy that is absorbed by the opening deformation of the sidewall portions, and to adjust the degree of opening deformation.

In one embodiment, at least a portion of the rib member extends from the top face portion to the same height position as the base portion, making it possible to adjust the degree of opening deformation of the sidewall portions through the rib members.

Preferably, a rounded part is formed along at least a portion of the boundary portion of adjacent sidewall portions. The rounded parts cause the degree to which the fracturing by the slit advances to be slower than the case wherein the rounded parts are not formed at the boundary portion of adjacent sidewall portions. The rounded parts can also cause the fracturing to not advance at all, thus making it possible to adjust the amount of collision energy that is absorbed by the opening deformation of the sidewall portions so as to produce the desired impact absorption characteristics.

Preferably the rounded part of the boundary portion of adjacent sidewall portions is formed from the height position of the top face portion to a height position that is essentially identical to a height position of a rib member connected along the sidewall portion. In one embodiment, the rounded parts that are formed at the boundary portions of adjacent sidewall portions are formed up to a height that is essentially identical to that of the connecting portions of the rib members to the sidewall portions. Thus, it is difficult for the degree of progression of the fracturing, by the slit, to advance to the part wherein the rib members are connected, or there is no such progression. This makes it possible to reliably adjust the amount of absorption of the collision energy by the opening deformation of the sidewall portions, and to adjust the amount of adjustment, through the rib members, to the degree of opening deformation, and possible to obtain energy absorption through the deformation of the rib members themselves more reliably.

Preferably, the base portions of the impact absorbing body have attachment portions for attaching to the door trim in at least two places, where these attachment portions are secured so that they will detach at the time of a side impact. This allows deformation at the time of a side collision, and allows the sidewall portions to open in the sideways direction more reliably. The impact absorbing body according to the present invention makes it possible to produce desired impact absorption characteristics effectively.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

An impact absorbing body according to embodiments of the present invention, and door trim provided with this impact absorbing body, will be explained below, referencing the appended drawings.

Figure 1:
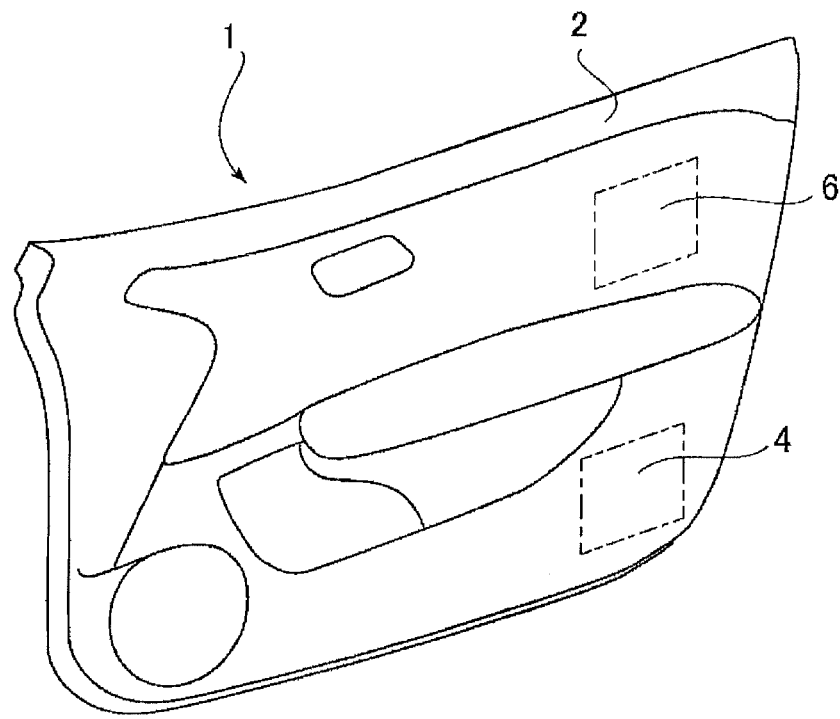
FIG. 1 is a perspective view of an installed vehicle interior component and an impact absorbing body according to an embodiment of the present invention, viewed from the vehicle cabin side.
Figure 2:
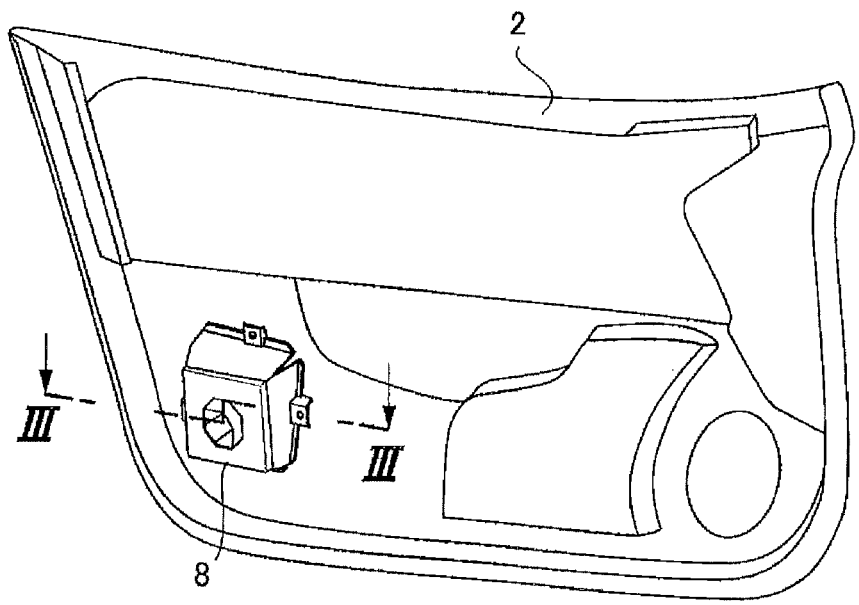
FIG. 2 is a perspective view of the vehicle interior component and the impact absorbing body according to an embodiment of the present invention, viewed from the exterior panel side.
Figure 3:
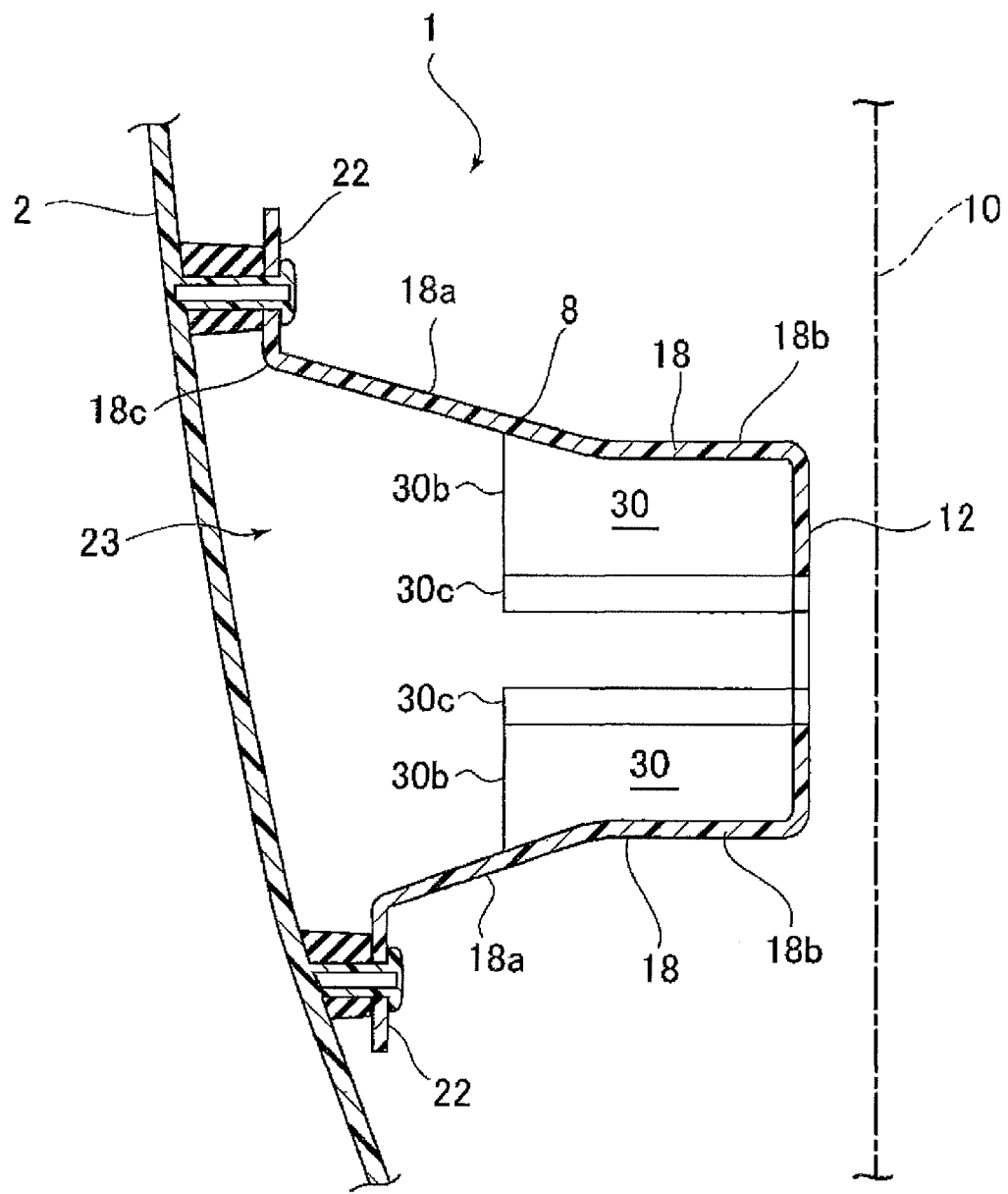
FIG. 3 is a cross-sectional view along the section of FIG. 2, showing the impact absorbing body together with a vehicle door exterior panel according to an embodiment of the present invention, for explaining the arrangement of the impact absorbing body between the vehicle interior component and the vehicle door exterior panel.

FIG. 1 through FIG. 3 illustrate the door trim, the exterior panel, and the arrangement of the impact absorbing body in relation thereto, according to an embodiment of the present invention. FIG. 1 is a perspective view of an installed vehicle interior component 1 provided with an impact absorbing body 8 according to an embodiment of the present invention, viewed from the vehicle cabin side; FIG. 2 is a perspective view of the vehicle interior component 1 with the impact absorbing body 8 according to an embodiment of the present invention, viewed from the exterior panel side; and FIG. 3 is a cross-sectional view of the vehicle interior component 1 of FIG. 2 along the section III-III, showing the vehicle door exterior panel 10 and the arrangement of an impact absorbing body 8 according to an embodiment of the present invention between the vehicle interior component 1 and the vehicle door exterior panel 10.

The vehicle interior component 1, illustrated in FIG. 1, is provided on the vehicle cabin side of the exterior panel 10 of a vehicle, and has a door trim 2 that is attached on the vehicle cabin side of the exterior panel 10. In FIG. 1, imaginary lines show a hip collision region 4, which is a region wherein a hip of a vehicle occupant within the vehicle cabin can collide with the door trim 2, at the time of a side collision. The imaginary lines also show a shoulder collision region 6, which is a region wherein a shoulder of a vehicle occupant in the vehicle cabin can collide with the door trim 2.

As illustrated in FIG. 2 and FIG. 3, the vehicle interior component 1 has the impact absorbing body 8, for protecting the vehicle occupant, attached to the exterior panel 10 side of the door trim 2. A case wherein the impact absorbing body 8 is attached to the hip collision region 4 will be explained herein as an example. Note that, typically, the space between the exterior panel 10 and the door trim 2 in the shoulder collision region 6 is narrower than the space between the exterior panel 10 and the door trim 2 in the hip collision region 4. Consequently, when the impact absorbing body 8 is attached to the shoulder region 6, wherein the space is tight, the impact absorbing body 8 is formed in a shape such that the dimension in the direction that is essentially perpendicular to the door trim 2 (the height) is small, and the dimensions in the directions that are essentially parallel to the door trim 2 (the width and depth) are large.

Figure 4:
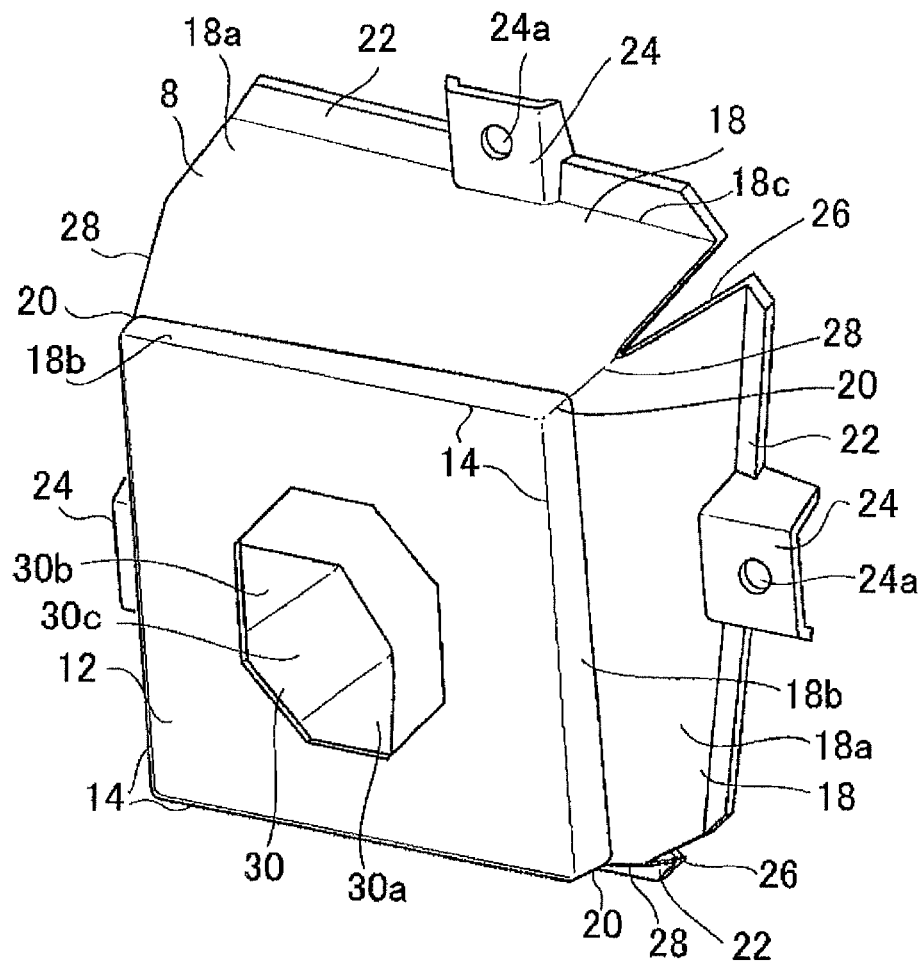
FIG. 4 is a perspective view of the impact absorbing body according to an embodiment of the present invention, viewed from a top face portion side thereof.
Figure 5:
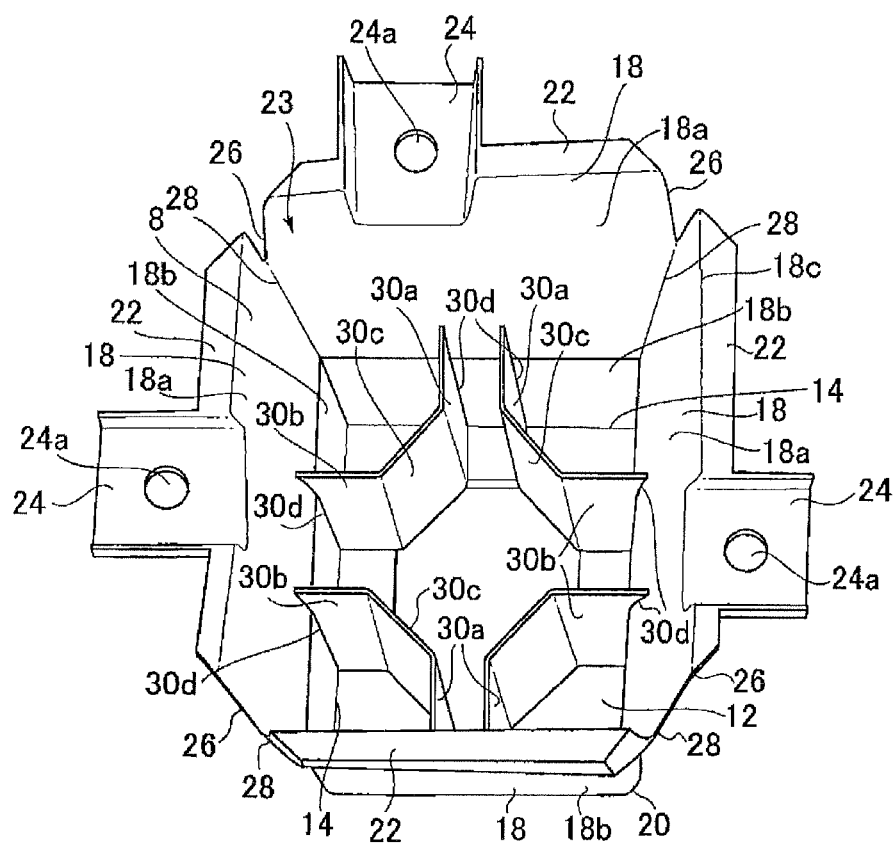
FIG. 5 is a perspective view of the impact absorbing body according to an embodiment of the present invention, viewed from a base portion side thereof.
Figure 6:
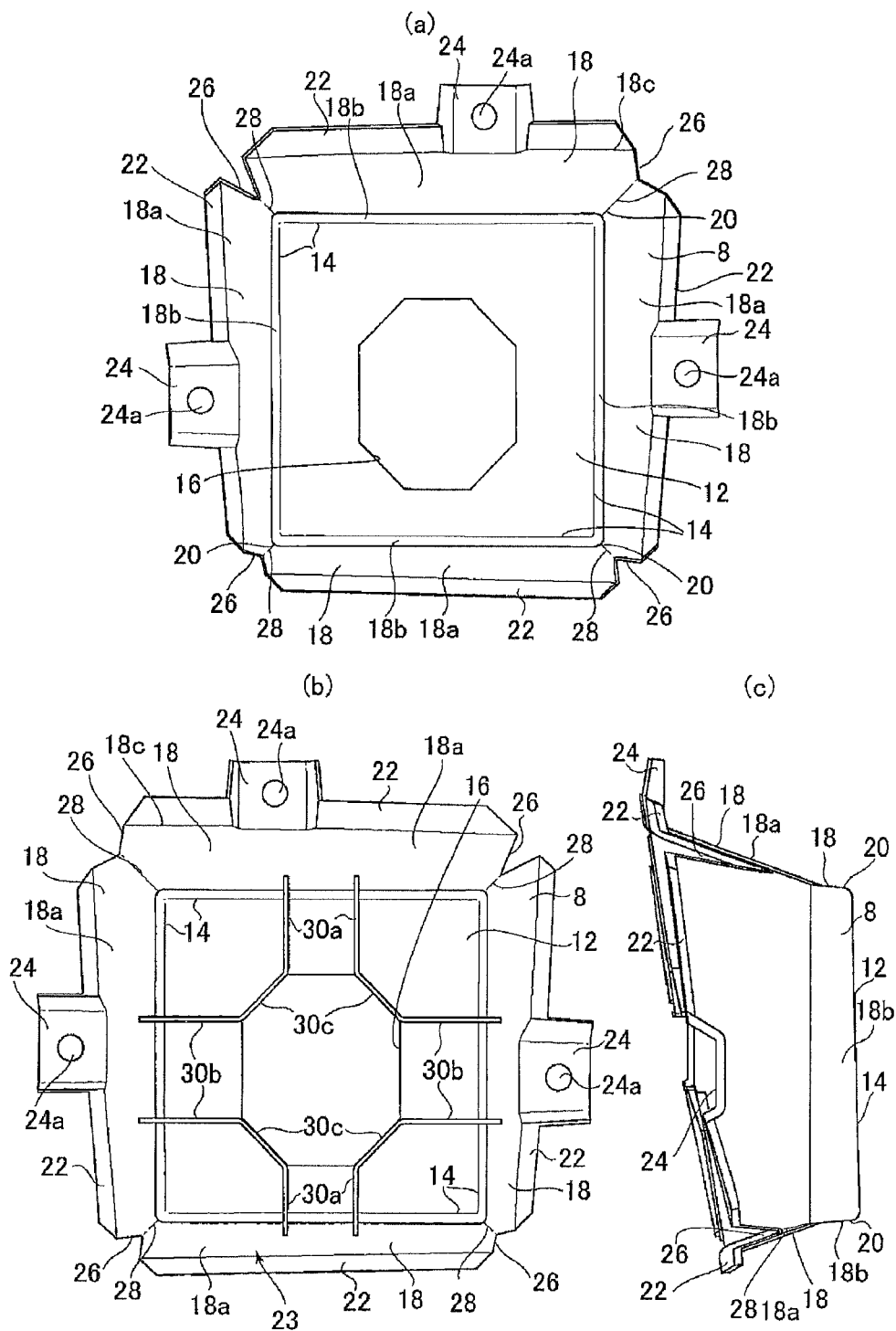
FIG. 6 is illustrates the impact absorbing body according to an embodiment of the present invention, wherein FIG. 6 (*a*) is a plan view of the impact absorbing body, FIG. 6 (*b*) is a bottom view of the impact absorbing body, and FIG. 6 (*c*) is a side view of the impact absorbing body.

The structure of the impact absorbing body 8 according to an embodiment of the present invention will be explained in detail next through FIG. 4 through FIG. 6. FIG. 4 is a perspective view of the impact absorbing body 8 according to an embodiment of the present invention, viewed from a top face portion side of the impact absorbing body 8. FIG. 5 is a perspective view of the impact absorbing body 8 according to an embodiment of the present invention, viewed from the base portion side of the impact absorbing body 8. FIG. 6 (a) is a plan view of the impact absorbing body 8, FIG. 6 (b) is a bottom view of the impact absorbing body 8, and FIG. 6 (c) is a side view of the impact absorbing body 8.

As illustrated in FIG. 4 through FIG. 6, the impact absorbing body 8 is, as a whole, structured as a hollow box with a rectangular shape and so that one face thereof is open. Preferably the impact absorbing body 8 is manufactured from a polypropylene (PP) in which ethylene propylene diene monomer (EPDM) is mixed, but may instead be manufactured using polypropylene alone, or another olefinic thermoplastic elastomer (TPO).

The impact absorbing body 8 has a top face portion 12 formed so as to bear the collision load from the exterior panel 10 at the time of a side collision. In one embodiment, the top face portion 12 is essentially rectangular and has four linear edge portions 14. Moreover, a first opening, for example an octagonal opening 16 is formed in the center of the top face portion 12.

As illustrated in FIG. 2 and FIG. 3, when the impact absorbing body 8 is attached to the door trim 2, the top face portion 12 is arranged so as to face the exterior panel 10. As a result, at the time of a side collision, the exterior panel 10, which is deformed through the load from the outside of the vehicle, contacts the top face portion 12, so that the top face portion 12 bears the collision load from the exterior panel 10. As illustrated in FIG. 3, in the present embodiment, the top face portion 12 is arranged so as to be essentially parallel with the exterior panel 10, so as to bear the collision load from the exterior panel 10 more effectively.

In one embodiment, the impact absorbing body 8 has four sidewall portions 18 that extend from the individual edge portions 14 of the top face portion 12 toward the door trim 2. Each sidewall portion 18 has a slanted portion 18a that is slanted toward the outside in the sideways direction of the impact absorbing body 8. The sidewall portions 18 extend outwardly from the edge portion 14 of the top face portion 12 toward the door trim 2. Thus, the slanted portions 18a cause the impact absorbing body 8, as a whole, to be wider toward the door trim 2 and further from the top face portion 12.

In more detail, each of the sidewall portions 18 has a perpendicular sidewall part (first sidewall part) 18b that extends to a specific height position in essentially the perpendicular direction from the edge portion 14 of the top face portion 12 toward the door trim 2 (that is, a position that is separated by a specific distance from the top face portion 12 along the direction that is perpendicular to the top face portion 12). Each of the sidewall portions 18 also has a slanted sidewall part (second sidewall part) 18a that extends from this specific height position to an edge portion 18c on the side opposite from the top face portion 12 in the sidewall portion 18. Of these, the slanted sidewall parts 18a are the slanted portions 18a, described above, and are slanted toward the outside direction and toward the sideways direction of the impact absorbing body 8. The height position of the boundary between the perpendicular sidewall part 18b and the slanted sidewall part 18a, and the slant of the slanted portion 18a, are set appropriately depending on the specification of the impact absorbing body 8.

Furthermore, in the present embodiment, a rounded part 20 is formed at a portion of the boundary portion 28 between mutually adjacent sidewall portions 18 (that is, an angled portion wherein the sidewall portions are connected to each other). Each angle portion of the impact absorbing body 8, formed at a boundary portion 28 between two adjacent sidewall portions 18, is rounded, specifically, a rounded chamfer extending from the top face portion 12 toward the door trim 2, along a specific length, which will be described in detail below.

Furthermore, as can be understood from FIG. 4 and FIG. 6 (c), the impact absorbing body 8 includes base portions 22 on the base portion side, which is the side opposite from the top face portion 12. As illustrated in FIG. 4 and FIG. 6, the base portions 22 are formed in flange shapes that extend to the outside in the sideways direction of the impact absorbing body 8 from the edge portion 18c of each individual sidewall portion 18 (from the edge portion 18c that is on the side opposite from the top face portion 12 in each sidewall portion 18). Moreover, the base portions 22 encompass a second opening, also referred to as an opening portion 23, which is open facing the door trim 2. At the time of a side collision, when the door trim 2 collides with a vehicle occupant, the collision load is transmitted through the door trim 2 to the individual edge portions 18c and base portions 22 of the impact absorbing body 8, so that the individual edge portions 18c and base portion 22 will bear the collision load.

In one embodiment, the base portion 22 has three attachment portions 24 that attach to the door trim 2. The individual attachment portions 24 are formed as tabs having flat plate shapes that extend to the outside in the sideways direction of the impact absorbing body 8 from the base portion 22. A through hole 24a is formed in each individual attachment portion 24 at a position corresponding to the door trim 2, and a plastic pin passes through the through hole 24a. The impact absorbing body 8 can be attached to the door trim 2 by passing the plastic pin through the through hole 24a of each attachment portion 24, and then melting the tip end portion of each plastic pin. These attachment portions 24 are provisionally secured so that the attachment will come off at the time of a side collision. That is, they are structured so that, when there is a side collision, the plastic pins will come out of the attachment portions 24, causing the attachment portions 24 to become detached from the door trim 2.

Following this, slits 26, which extend from the base portions 22, are formed at each of the boundary portions 28 of adjacent sidewall portions 18. The slits 26 are formed with the bottom edges thereof at the base portions and at the boundary portions 28 of adjacent sidewall portions 18. The slits 26 have triangular shapes forming apexes at the boundary portions 28 of adjacent sidewall portions 18, and the slits 26 extend to a specific height position from the base portions 22. The height of the slit 26 (that is, the length of the slit 26 from the base portion 22, extending in a direction that is perpendicular to the top face portion 12) is set appropriately depending on the specification of the impact absorbing body 8. In one embodiment, the apex of the triangle is spaced from the linear edge portions 14 of the top face portion 12 by part of the boundary portion 28 between the adjacent sidewall portions 18.

Next, as illustrated in FIG. 5 and FIG. 6, the impact absorbing body 8 has rib members 30 that extend toward the base portion 22 from the top face portion 12 inwardly into the hollow box. The rib members 30 also extend so as to connect mutually adjacent sidewall portions 18 together. In the embodiment of FIG. 5 and FIG. 6 (b), a rib member 30 is provided at each of the four corners wherein two sidewall portions 18 connect together.

In one embodiment, each rib member 30 has a first rib part 30a extending from one of the two mutually connecting sidewall portions 18 essentially perpendicularly toward the inside of the hollow box, a second rib part 30b extending from the other of the two mutually-connecting sidewall portions 18 essentially perpendicularly toward the inside of the hollow box, and a third rib part 30c connecting the first rib part 30a and second rib part 30b together. The edges of each third rib part 30c on the top face portion 12 side are connected to the respective edges of the octagonal opening 16 that is formed in the top face portion 12.

In the embodiments of FIG. 3, FIG. 5, and FIG. 6 (b), the rib members 30a, 30b, and 30c are formed to extend in a direction perpendicular to the top face portion 12 and to a specific height position between the top face portion 12 and the base portions 22. Specific gaps are formed thereby between the edges of these rib members 30a, 30b, and 30c, on the base portion 22 side, and the base portions 22.

Moreover, the first rib part 30a and second rib part 30b have connecting portions 30d that are connected to the sidewall portions 18 and extend along the sidewall portions 18. The connecting portions 30d have a specific height position from the top face portion 12 (referencing FIG. 5). Here the rounded parts 20 of the boundary portions 28 of the individual sidewall portions 18, described above, are formed to essentially the same height as the height of these connecting portions 30d from the top face portion 12. That is, the length of the rib member 30 along the direction that is perpendicular to the top face portion 12 is essentially equal to the length of the rounded parts 20 along the direction that is, similarly, perpendicular to the top face portion 12.

The respective heights of the first rib parts 30a, second rib parts 30b, and third rib parts 30c, which structure the rib members 30 (that is, the lengths thereof from the top face portion 12 along the direction that is perpendicular to the top face portion 12) are set appropriately depending on the specification of the impact absorbing body 8. Although the heights of the first rib parts 30a, second rib parts 30b, and third rib parts 30c are identical to each other in the example illustrated in FIG. 5, each extending to a height position between the top face portion 12 and the base portions 22, conversely, there may be cases wherein rib members 30 of different heights are provided.

Figure 7:
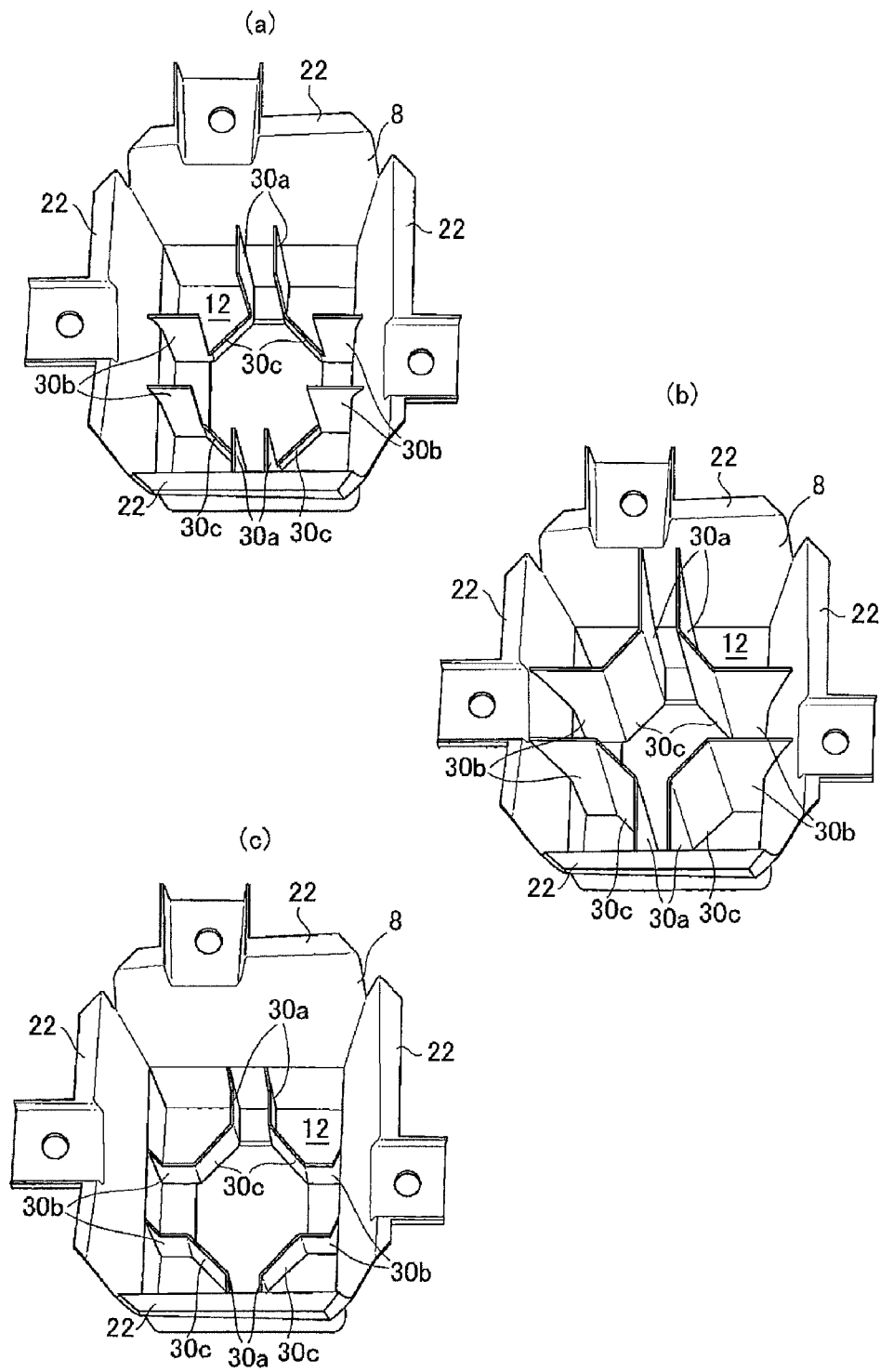
FIG. 7 includes three perspective views of the impact absorbing body, viewed from the base portion side, showing three examples of rib members of the impact absorbing body according to an embodiment of the present invention.

Modified examples of rib members 30 of the impact absorbing body 8 according to embodiments of the present invention will be explained through FIG. 7. FIG. 7 includes perspective view of the modified examples of rib members 30 according to embodiments of the present invention, viewed from the base portion side of the impact absorbing body 8.

In these modified examples, as illustrated in FIG. 7 (a), for example, the first rib parts 30a and second rib parts 30b may be formed so as to extend to a height position between the top face portion 12 and the base portion 22, and the third rib parts 30c may be formed so as to extend to a height position that is less than that of the first rib parts 30a and the second rib parts 30b. Moreover, as illustrated in FIG. 7 (b), the first rib parts 30a, second rib parts 30b, and third rib parts 30c may be formed so as to extend from the top face portion 12 to the height position of the base portions 22. Moreover, as illustrated in FIG. 7 (c), the first rib parts 30a, the second rib parts 30b, and the third rib parts 30c may be formed so as to extend to a height position that is less than that of the example illustrated in FIG. 5.

Figure 8:
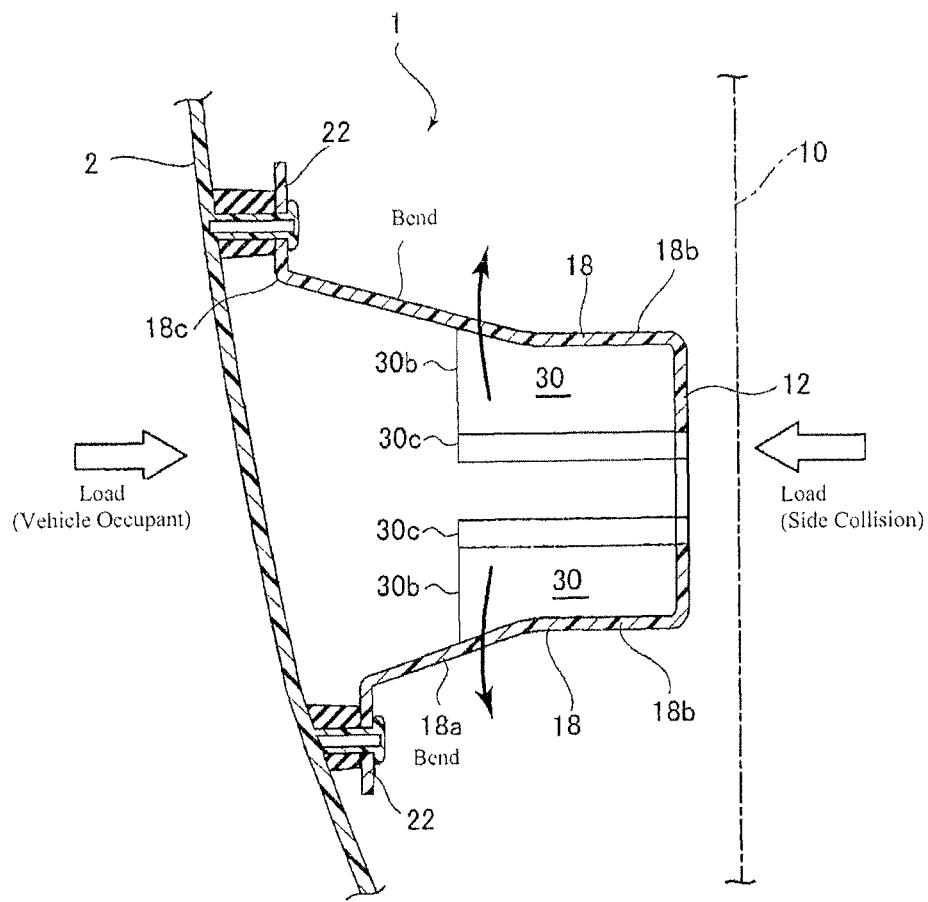
FIG. 8 is a cross-sectional view, shown similarly to FIG. 3, for explaining the impact load acting on the impact absorbing body according to an embodiment of the present invention at the time of a side collision and the deforming forces that are produced in the impact absorbing body.
Figure 9:
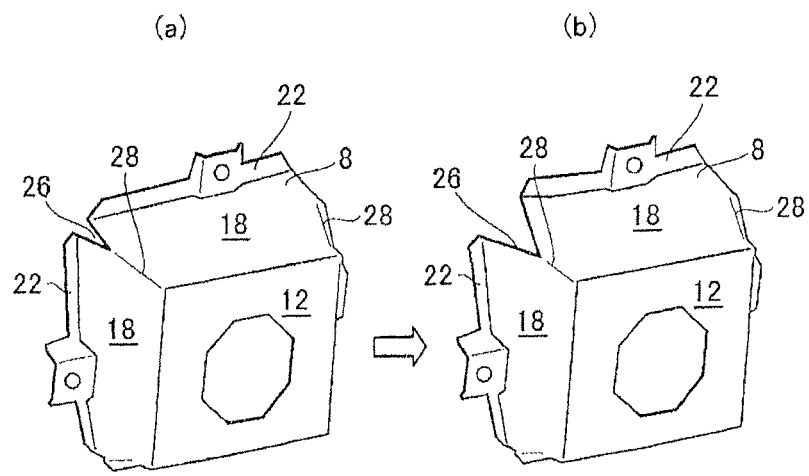
FIG. 9 is a perspective view for explaining the state of deformation when the impact absorbing body according to an embodiment of the present invention bears a collision load at the time of a side collision, wherein FIG. 9 (a) illustrates the impact absorbing body prior to deformation and FIG. 9 (b) illustrates impact absorbing body after deformation, wherein a slit in the impact absorbing body has opened.
Figure 10:
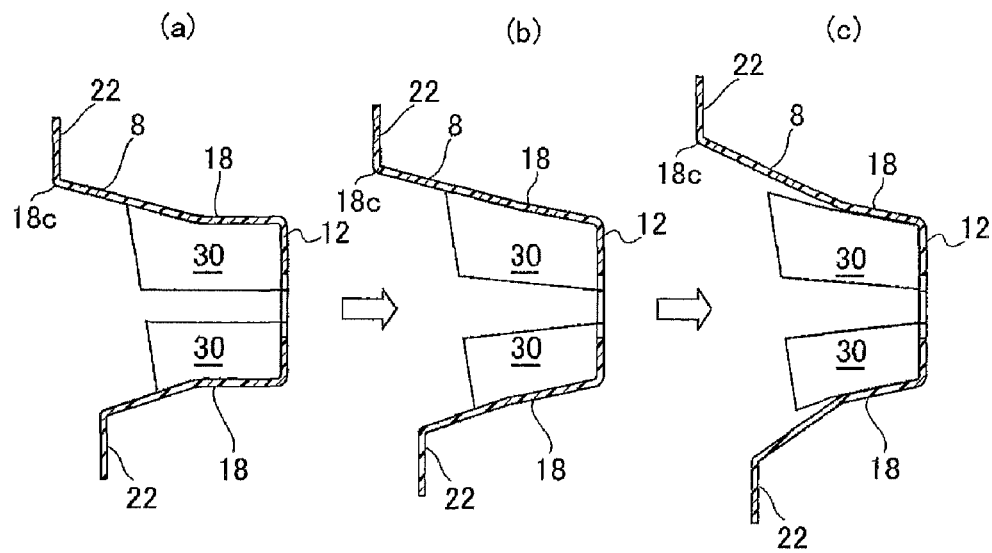
FIG. 10 is a cross-sectional view explaining the state of deformation when the impact absorbing body according to an embodiment of the present invention bears a collision load at the time of a side collision, wherein FIG. 10 (a) illustrates the impact absorbing body prior to deformation, FIG. 10 (b) illustrates the state of deformation of the impact absorbing body from the early stage of the collision to the middle stage thereof, and FIG. 10 (c) illustrates the state of deformation of the impact absorbing body from the middle stage of the collision to the late stage thereof.

The way in which the impact absorbing body 8 according to an embodiment of the present invention deforms at the time of a side collision will be explained through FIG. 8 through FIG. 10. FIG. 8 is a cross-sectional view illustrating the way in which the collision load acts on the impact absorbing body 8 according to an embodiment of the present invention, and the way in which the impact absorbing body 8 deforms. FIG. 9 is a perspective diagram for explaining the state of deformation when the impact absorbing body 8 according to an embodiment of the present invention bears a collision load at the time of a side collision. FIG. 9 (a) illustrates the impact absorbing body prior to deformation and FIG. 9 (b) illustrates the impact absorbing body 8 after deformation, wherein the slits of the impact absorbing body have opened. FIG. 10 is a cross-sectional view illustrating the state of deformation when the impact absorbing body according to an embodiment of the present invention bears a collision load at the time of a side collision. FIG. 10 (a) illustrates the impact absorbing body prior to deformation, FIG. 10 (b) illustrates the deformed state of the impact absorbing body from the beginning stage of deformation through the middle stage, and FIG. 10 (c) illustrates the deformed state of the impact absorbing body from the middle stage of deformation through the late stage.

First, as illustrated in FIG. 8, the collision load from the impact of a vehicle occupant against the door trim 2, from the vehicle cabin side, at the time of a side collision, is transmitted through the door trim 2 to the edge portions 18c and the base portions 22 of the impact absorbing body 8, and these edge portions 18c and base portions 22 bear the collision load. Moreover, when, at the time of a side collision, the exterior panel 10 is deformed by the load from outside of the vehicle, so as to contact the top face portion 12, the top face portion 12 bears the collision load from the exterior panel 10.

The impact absorbing body 8 bears a load from the door trim 2 and the exterior panel 10, in directions that are essentially perpendicular to the top face portion 12. In this embodiment, each sidewall portion 18 of the impact absorbing body 8 has the slanted portion 18a that is slanted toward the outside in the sideways direction of the impact absorbing body 8, and thus a bending moment, as illustrated in FIG. 8, acts on each sidewall portion 18 so as to spread each sidewall portion 18 further toward the outside in the sideways direction. Moreover, at the time of a side collision, the plastic pins come out of the attachment portions 24, to cause the attachment portions 24 to become detached from the door trim 2, so that each of the sidewall portions 18 can deform more easily toward the outside in the sideways direction.

As illustrated in FIG. 9, when, at the time of a side collision, the impact absorbing body 8 bears loads from the door trim 2 and the exterior panel 10, in directions that are essentially perpendicular to the top face portion 12, and the bending moments act so as to spread the sidewall portions 18 toward the outside in the sideways direction, the concentration of the forces at the apexes of the slits 26 that are formed at the boundary portions 28 between adjacent sidewall portions 18 produce a fracture between the adjacent sidewall portions 18. As the fracturing advances, as shown in FIG. 9 (b), each of the sidewall portions 18 deforms so as to open further toward the outside in the sideways direction. The collision energy is absorbed in the early stage of the collision (the early stage of the impact absorbing body 8 bearing the collision load) through the advancement of the fracturing and the deformation of the sidewall portions 18.

As illustrated in FIG. 10, the rib members 30 that connect adjacent sidewall portions 18 also deform when, at the time of a side collision, the impact absorbing body 8 bears loads from the door trim 2 and the exterior panel 10, in directions that are essentially perpendicular to the top face portion 12, and the bending moments act so as to spread the sidewall portions 18 toward the outside in the sideways direction (as illustrated in FIG. 8), and together with the sidewall portions 18 deforming so as to further open to the outside in the sideways direction, as illustrated in FIG. 10 (b). That is, the collision energy in the early stage of the collision is absorbed by deformation of the rib members 30.

Thereafter, as illustrated in FIG. 10 (c), when the sidewall portions 18 open further toward the outside in the sideways direction, the concentration of the stresses on the connecting portions 30d, wherein the rib members 30 are connected to the sidewall portions 18, causes a fracture in the connecting portions 30b, and causes deformation so as to peel the rib members 30 from the sidewall portions 18. The collision energy is absorbed, primarily in the middle stage through the late stage of the collision, through the peeling of the rib members 30 from the sidewall portions 18 in this way.

Furthermore, although not illustrated, when a specific gap is formed between the edges of the rib members 30a, 30b, and 30c, on the base portion 22 sides, and the base portions 22, then after the deformation (crushing) of the impact absorbing body 8 has advanced so that the edge portions of the rib members 30a, 30b, and 30c, on the base portion 22 side, contact the door trim 2, the rib members 30a, 30b, and 30c themselves will bear the collision load directly, and deform through folding, bending, twisting, and the like. Thus, a large amount of the collision energy is absorbed thereby, particularly from the middle stage of the collision to the late stage of the collision.

The impact absorption characteristics of the impact absorbing body 8 according to an embodiment of the present invention, and the deformation thereof, will be explained through FIG. 11 and FIG. 12, which include examples of tests.

Figure 11:
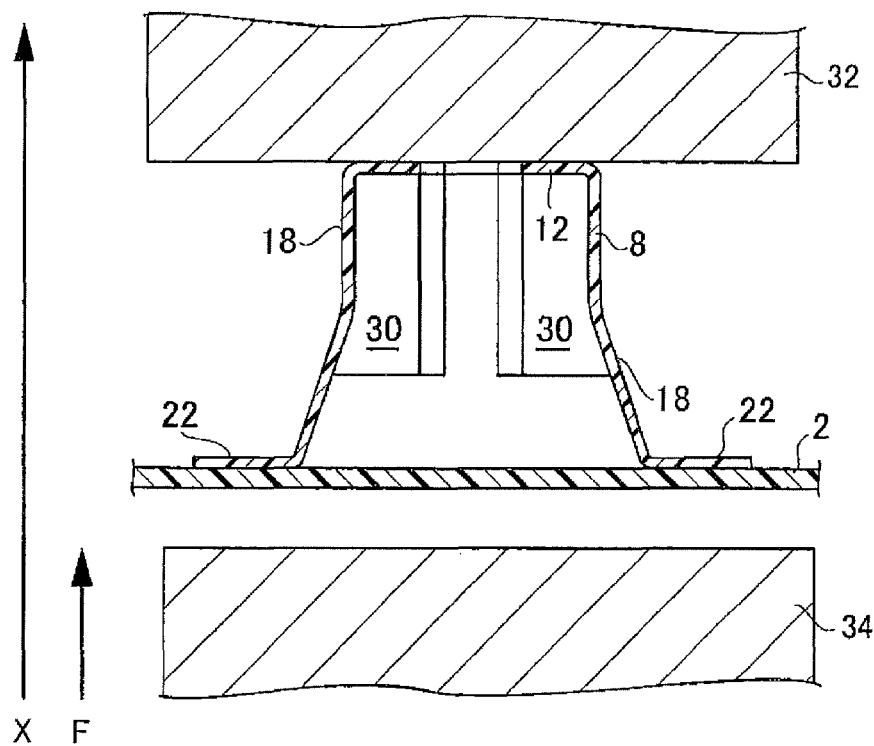
FIG. 11 is a cross-sectional view illustrating one schematic example of a test apparatus for measuring the impact absorption characteristics of the impact absorbing body according to an embodiment of the present invention.
Figure 12:
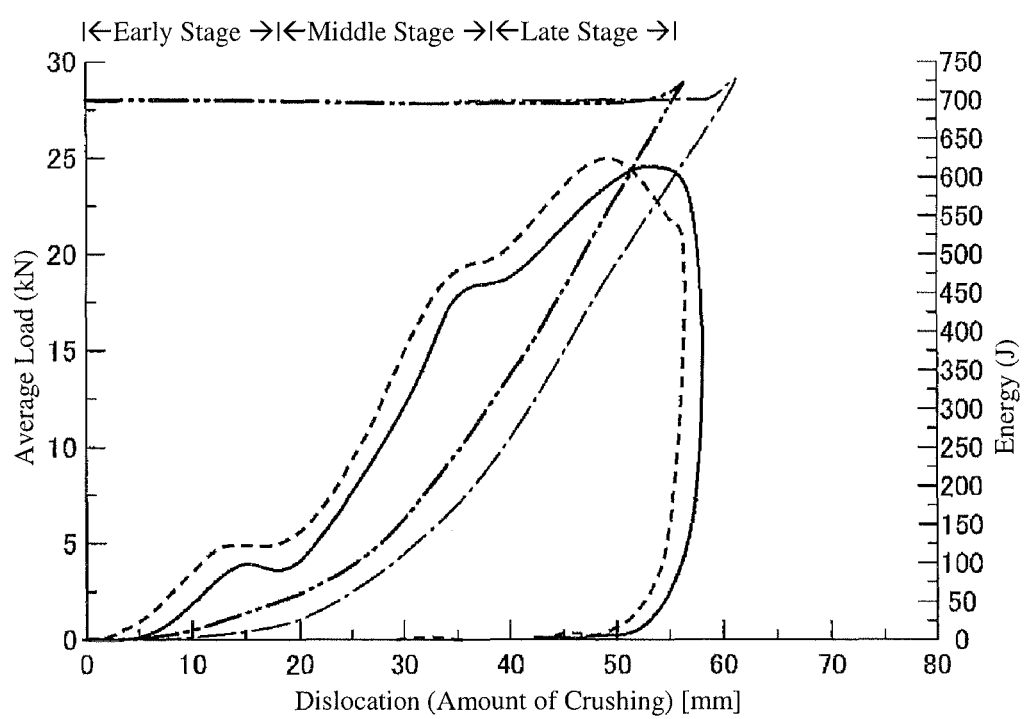
FIG. 12 is a graph illustrating the impact absorption characteristics of the impact absorbing body measured by the test apparatus illustrated in FIG. 11.

FIG. 11 is a cross-sectional view illustrating a test apparatus for measuring the impact absorption characteristics of the impact absorbing body 8, and FIG. 12 is a graph showing the impact absorption characteristics of the impact absorbing body 8 measured by the test apparatus illustrated in FIG. 11.

First, the impact absorbing body 8 tested was attached to the door trim 2, as illustrated in FIG. 11, and the top face portion 12 thereof was secured to a securing wall (jig) 32. A load body 34 (a rigid body, envisioning a hip or shoulder of a vehicle occupant) moves toward the door trim 2 along a direction that is perpendicular to the top face portion 12 (the x-axial direction in FIG. 11) from the door trim 2 side, to apply a load F to the impact absorbing body 8 through the door trim 2. The dislocation of the load body 34 at this time (that is, the amount of crushing of the impact absorbing body 8), and the average load applied by the load body 34 (that is, the load borne by the impact absorbing body 8) can be measured to define the impact absorption characteristics of the impact absorbing body 8.

The results obtained in this way are shown in FIG. 12, wherein the horizontal axis shows the dislocation after the load body 34 has contacted the door trim 2 (that is, the amount by which the impact absorbing body 8 is crushed), the vertical axis on the left indicates the average load applied by the load body 34 (that is, the load borne by the impact absorbing body 8), and the vertical axis on the right side indicates the amount of energy absorbed by the impact absorbing body 8, calculated from the dislocation and the average load.

In this testing, two types of impact absorbing bodies 8 were used: the impact absorbing bodies illustrated in FIG. 4 through FIG. 6 (that is, an impact absorbing body 8 wherein the rib members 30 extend to a height position between the top face portion 12 and the base portions 22, termed here the "first impact absorbing body 8"), and an impact absorbing body 8 as illustrated in FIG. 7 (*b*), wherein the rib members 30 extend to the height position of the base portions 22, and wherein the height of the slits 26 is less than that of the first impact absorbing body 8 (termed the "second impact absorbing body 8"). Note that all of the impact absorbing bodies 8 used in this testing had a thickness of 2.5 mm for the sidewall portions 18, and a thickness of 2.0 mm for the rib members 30.

In FIG. 12, the solid line indicates the average load on the first impact absorbing body 8 and the dotted line indicates the average load on the second impact absorbing body 8. Moreover, the line with the dashes and the single dots indicates the amount of energy absorbed by the first impact absorbing body 8, and the line with the dashes and the double dots indicates the amount of energy absorbed by the second impact absorbing body 8.

As described above, the height of the slits 26 in the second impact absorbing body 8 was less than that of the first impact absorbing body 8. That is, the length divided by the slits 26 at the boundary portions 28 of adjacent sidewall portions 18 was shorter in the sidewall portions 18 of the second impact absorbing body 8 than in the sidewall portions 18 of the first impact absorbing body 8, thus causing the deformation to the outside in the sideways direction to be more difficult. Consequently, as illustrated in FIG. 12, in the early stage of the collision, the average load on the second impact absorbing body 8 (indicated by the dotted line) was greater than the average load on the first impact absorbing body 8 (indicated by the solid line), and the amount of energy absorbed by the second impact absorbing body 8 (the dashed line with double dots) was greater than the amount of energy absorbed by the first impact absorbing body 8 (the dashed line with single dots).

As described above, the height of the rib members 30 in the second impact absorbing body 8 was greater than that in the first impact absorbing body 8. Thus, the force by which the sidewall portions 18 are held through the rib members 30 connecting the sidewall portions 18 together was stronger in the second impact absorbing body 8. Because the length of the connecting portion 30*d* wherein the rib members 30 are connected to the sidewall portions 18 are longer in the second impact absorbing body 8, the sidewall portions 18 of the second impact absorbing body 8 have greater rigidity, due to the rib members 30, than the sidewall portions 18 of the first impact absorbing body 8. Consequently, it is more difficult for the sidewall portions 18 of the second impact absorbing body 8 to deform outward in the sideways direction than it is for the sidewall portions 18 of the first impact absorbing body 8.

Furthermore, the length of the connecting portions 30*d*, wherein the rib members 30 are connected to the sidewall portions 18, is longer in the second impact absorbing body 8, and thus the collision energy that is absorbed when the rib members 30 peel from the sidewall portions 18 is greater in the second impact absorbing body 8 than in the first impact absorbing body 8.

Consequently, as illustrated in FIG. 12, the average load on the second impact absorbing body 8 is larger than the average load on the first impact absorbing body 8 from, primarily, the middle stage of the collision through the late stage thereof, so the amount of energy absorbed by the second impact absorbing body 8 is greater than the amount of energy absorbed by the first impact absorbing body 8.

It is possible to change the impact absorption characteristics of the impact absorbing body 8 through adjusting, in advance, the height of the slits 26 and the thickness and height of the rib members 30.

Details of the relationship between the adjustments to the height of the slits 26 and the thickness and height of the rib members 30 with the changes in the corresponding impact absorption characteristics are given in the following table.

TABLE 1

| Details of Adjustment | Change in the Impact Absorption Characteristics |
| --- | --- |
| Increased height of the slits | Reduced average load during the early stage of the collision |
| Reduced height and/or thickness of the rib portions | Reduced average load in the middle stage through the late stage of the collision |
| Reduced height of the slits | Increased average load during the early stage of the collision |
| Increased height and/or thickness of the rib portions | Increased average load in the middle stage through the late stage of the collision |

Moreover, it is possible to change the impact absorption characteristics through adjusting, in advance, the thickness of the sidewall portions 18, the slant angle of the slanted portions 18*a*, or the length of the rounded parts 20 and the size of the rounding. For example, increasing the thickness of the sidewall portions 18 will increase the stiffness of the sidewall portions 18, thus increasing the average load from the early stage of the collision through the late stage. Adjusting the slant angle of the slanted portions 18*a* so as to be closer to a direction that is parallel to the direction in which the top face portion 12 extends than it is in the present form of embodiment that is illustrated, that is, further increasing the slant angle of the slanted portions 18*a* toward the outside in the sideways direction of the impact absorbing body 8, enables the sidewall portions 18 to deform more easily toward the outside in the sideways direction of the impact absorbing body 8, thus reducing the average load at the early stage of the collision. Moreover, the average load can be adjusted more reliably over the early stage of the collision through the middle stage by increasing the length of advancement of the fracturing in the boundary portions 28 through increasing the length of the rounded part 20. It is possible to decrease or increase the average load over the early stage of the collision through the middle stage by an appropriate selection for the radius of curvature of the rounding for the rounded part 20 so as to decrease or increase the degree of advancement of the fracturing in the boundary portions 28.

Further examples of embodiments of the present invention will be explained next. While in the embodiments set forth above the impact absorbing body 8 was formed as a hollow rectangular box, the impact absorbing body 8 may be formed as a hollow box with a polygonal prism shape of a pentagonal prism, or above, wherein, for example, the top face portion 12, as described above, has a pentagonal shape and includes five of the sidewall portions 18 described above.

Figure 13:
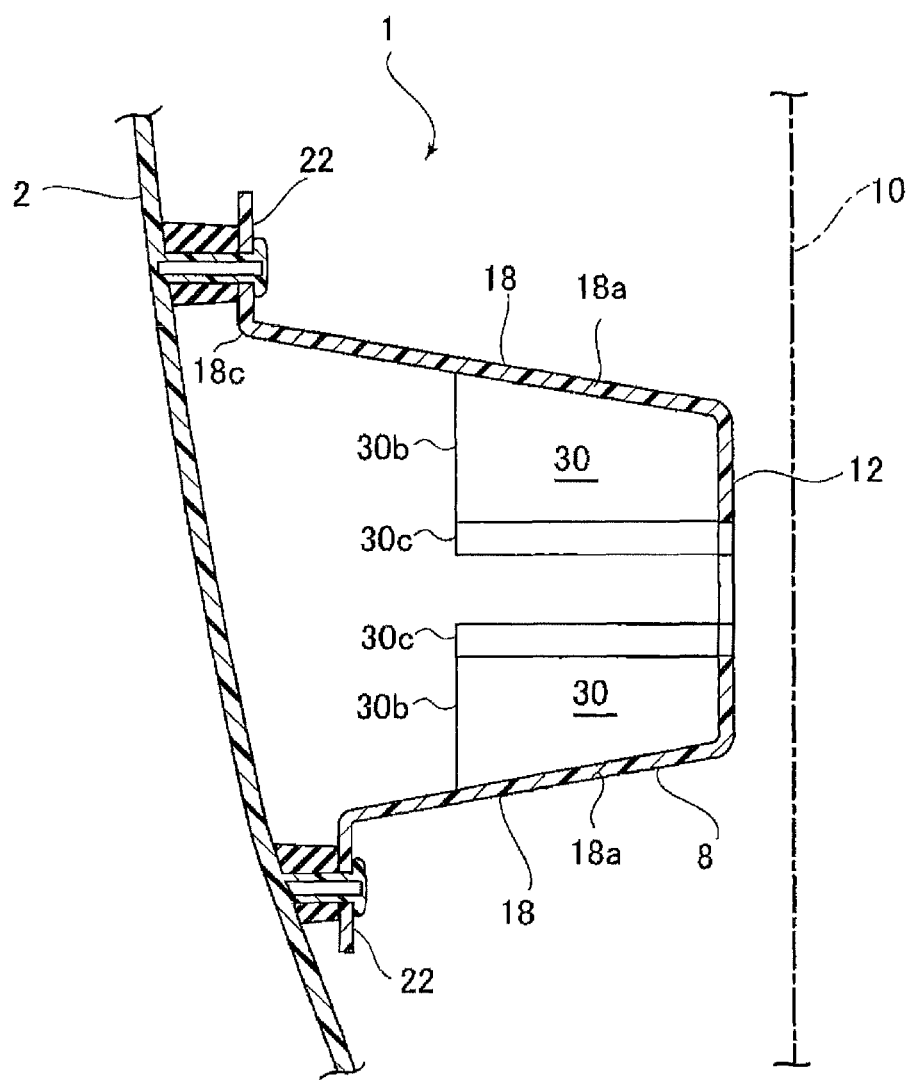
FIG. 13 is a cross-sectional view illustrating a modified example of the impact absorbing body according to an embodiment of the present invention.

Moreover, while, in the embodiments set forth above, each of the sidewall portions 18 has a first sidewall part 18b that extends to a specific height position in a direction that is essentially perpendicular from an edge portion 14 of the top face portion 12 toward the door trim 2, and a second sidewall part 18a that extends from that specific height position to the edge portion 18c of the sidewall portion 18 on the side opposite from the top face portion 12, instead, as illustrated in FIG. 13, the entirety of the sidewall portion may be the slanted portion 18a. That is, the slanted portion 18a of the sidewall portion 18 may extend from the top face portion 12 to the base portion 22. Doing so makes it possible to cause the sidewall portion 18 to deform so as to open in the sideways direction more effectively.

Moreover, while in the embodiments set forth above the slits 26 were formed in all of the individual boundary portions 28 between adjacent sidewall portions 18, instead slits 26 may be formed in two or more of the boundary portions 28. For example, slits 26 may be formed at two adjacent boundary portions 28, with slits 26 not formed at the other two boundary portions 28. Conversely, slits 26 may be formed at two boundary portions 28 that are positioned diagonally from each other, with slits 26 not formed in the other two boundary portions 28.

Moreover, while in the embodiments set forth above rib members 30 were provided at each of the four corners wherein two sidewall portions 18 are adjacent to each other, instead the rib members 30 may connect together at least two sets of adjacent sidewall portions 18. For example, rib members 30 may be provided at two adjacent corners, with rib members 30 not provided at the other corners. Conversely, rib members 30 may be provided at two corners that are diagonal from each other, with rib members 30 not provided at the other corners.

Furthermore, while in the embodiment set forth above, slits 26 and rib members 30 were formed at four locations each, there may be different numbers of slits 26 and rib members 30. For example, the slits 26 may be formed at two boundary portions 28 that are positioned diagonally from each other, and rib members 30 may be provided at each of the four corners wherein two sidewall portions 18 are adjacent to each other. The numbers of slits 26 and rib members 30 can be adjusted in advance to produce, effectively, desired impact absorption characteristics over the early stage, middle stage, and late stage of a collision.

Moreover, while in the embodiment set forth above the impact absorbing body 8 was secured to the door trim 2 in three locations (there were three attachment portions 24), there is no limit thereto, but rather this may be two locations or four locations.

Effects of operation of the impact absorbing body 8 according to embodiments of the present invention will be explained next. Because the impact absorbing body 8 according to embodiments of the present invention has an opening formed at the base portions 22 of the impact absorbing body 8, slits 26 that extend from the base portions 22, formed in the boundary portions 28 of adjacent sidewall portions 18, and a plurality of sidewall portions 18 that have slanted portions 18a that are slanted toward the outside in the sideways direction thereof, in the early stage of a collision, fractures are produced first at the boundary portions 28 of the adjacent sidewall portions 18 due to the slits 26, and, as that fracturing advances, the individual sidewall portions 18 can be deformed so as to effectively open toward the outside because of the existence of the slanted portions 18a. Rib members 30 are provided in the impact absorbing body 8, connecting adjacent sidewall portions 18 together, thus making it possible to adjust the amount of collision energy that is absorbed, in the early stage of the collision, in particular, by adjusting the degree of opening deformation of the sidewall portions 18, through the rib members 30. Moreover, in the middle stage of the collision and the late stage of the collision, the collision energy may be absorbed through deformation of the rib members 30. Here, for the amount of collision energy absorbed through the opening deformation of the sidewall portions 18, as described above, the amount of adjustment, through the rib members 30, to the degree of opening deformation, and the amount of collision energy absorbed through deformation of the rib members 30 themselves, the thicknesses and heights of the individual sidewall portions 18 and rib members 30, the slant angles of the slanted portions 18a of the sidewall portions 18, and the like, primarily, can be adjusted in advance to produce the desired impact absorption characteristics. The impact absorption characteristics can also be optimized through testing and analysis, and the like, in the design stage. Consequently, it is possible to obtain desired impact absorption characteristics effectively in the early, middle, and late stages of a collision.

When the slits 26 are shaped as triangles having apexes formed at the boundary portions 28 of adjacent sidewall portions 18, it is possible to effectively produce fractures at the boundary portions 28 of adjacent sidewall portions 18. Moreover, the height position (the specific height position) of the slits 26, from the base portion 22, can be adjusted in advance to adjust the impact absorption characteristics at the early stage of a collision.

Moreover, the length of the first sidewall parts 18b of the sidewall portions 18 in the height direction (the distance from the top face portion 12 to the specific height position) and the length of the second sidewall parts 18a, which are the slanted portions 18a, in the height direction (the distance from the specific height to the base portions 22) can be adjusted in advance to adjust the amount of collision energy absorbed by the opening deformation of the sidewall portions 18, from the beginning stage of the collision, to produce desired impact absorption characteristics.

Moreover, the respective thicknesses, heights, and widths of the first rib parts 30a, second rib parts 30b, and third rib parts 30c can be adjusted in advance to adjust the amount of collision energy absorbed by the opening deformation of the sidewall portions 18. The respective thicknesses, heights, and widths of the first rib parts 30a, second rib parts 30b, and third rib parts 30c can also be adjusted to adjust degree of opening deformation, thereby making it possible to obtain desired impact absorption characteristics.

Moreover, the height position of the edges of the base portion 22 sides of the rib members 30 can be adjusted to adjust the amount of collision energy absorbed through the opening deformation of the sidewall portions 18 and to adjust the degree of the opening deformation. Furthermore, the rib members 30 can be extended to the height position of the base portions 22, to adjust the amount of adjustment, through the rib members 30, in the degree of opening deformation of the sidewall portions 18 from the early stage of a collision.

Moreover, because rounded parts 20 are formed at the boundary portions 28 of adjacent sidewall portions 18, the degree of advancement of fracturing of the slits 26 is slower than the case wherein the rounded parts 20 are not formed in the boundary portions 28 of the adjacent sidewall portions 18, or the fractures do not advance at all, making it possible to adjust the amount of absorption of the collision energy through the opening deformation of the sidewall portions 18 so as to produce the desired impact absorption characteristics.

Moreover, the rounded parts 20 that are formed at the boundary portions 28 of adjacent sidewall portions 18 are formed to essentially the same height as the connecting portions 30*d* of the rib members 30, which connect to the sidewall portions 18, causing advancement of the fracturing to be difficult, or no fracturing at all, in the parts wherein the rib members 30 are connected. Thus, it is possible to adjust the amount of absorption of the collision energy by opening deformation of the sidewall portions 18. It is also possible to adjust the rib members 30 and the degree of opening deformation, to obtain, more reliably, absorption of energy by deformation of the rib members 30.

Moreover, the attachment portions 24 for attaching the base portions 22 of the impact absorbing body 8 to the door trim 2 are secured provisionally to cause the attachment to become detached at the time of a side collision. Thus, the sidewall portions 18 can open more effectively in the sideways directions at the time of a side collision.

Obviously, many modifications and variations of the present invention are possible in light of the above teachings and may be practiced otherwise than as specifically described while within the scope of the appended claims. Although the steps of the method set forth herein are presented in a particular order, many variations in the order of the steps are possible. Accordingly, the present invention is not limited to the particular order of the method steps presented herein.

What is claimed is:

1. An impact absorbing body for attachment to a door trim, comprising:
    a top face portion for bearing a collision load from an exterior panel of a vehicle, the top face portion having at least four linear edge portions, and the top face portion presenting a first opening;
    a plurality of sidewall portions extending from the linear edge portions of the top face portion to base edge portions, wherein adjacent sidewall portions present a boundary portion therebetween, wherein a plurality of the sidewall portions have slanted portions, and wherein the slanted portions are slanted outwardly;
    a plurality of base portions extending outwardly from the base edge portions of the sidewall portions for attaching to the door trim, the base portions surrounding a second opening;
    at least two slits, wherein each slit extends from between adjacent base portions along the boundary portion between adjacent sidewall portions toward the top face portion;
    at least two rib members, wherein each rib member extends from the top face portion toward the base portions and connects adjacent sidewall portions together;
    wherein a first rib member of the at least two rib members includes a first rib part extending from a first sidewall portion toward the first opening, a second rib part extending from a second sidewall portion adjacent the first sidewall portion toward the first opening, and a third rib part, extending along the first opening and interconnecting the first and second rib parts of the first rib member;
    wherein a second rib member of the at least two rib members includes a first rib part extending from a third sidewall portion adjacent the second sidewall portion toward the first opening, a second rib part extending from the second sidewall portion toward the first opening and a third rib part extending along the first opening and interconnecting the first and second rib parts of the second rib member, and wherein the second rib part of the second rib member is spaced from the second rib part of the first rib member by a portion of the second sidewall portion.

2. An impact absorbing body as set forth in claim 1, wherein each of the slits is shaped as a triangle, and an apex of the triangle is positioned at a specific height along the boundary portion between the adjacent sidewall portions.

3. An impact absorbing body as set forth in claim 2, wherein the apex of the triangle is spaced from the linear edge portions of the top face portion by part of the boundary portion between the adjacent sidewall portions.

4. An impact absorbing body as set forth in claim 1, wherein the sidewall portions have first sidewall parts extending from the top face portion toward the base portions to a specific height position, the first sidewall parts are essentially perpendicular to the top face portion, and the sidewall portions include the slanted portions extending from the specific height position to the base portions.

5. An impact absorbing body as set forth in claim 1, wherein the slanted portions of the sidewall portions extend from the top face portion to the base portions.

6. An impact absorbing body as set forth in claim 1, wherein the first opening has an octagonal shape and is formed in the center of the top face portion and the third rib parts are connected to edges of the octagonal opening.

7. An impact absorbing body as set forth in claim 1, wherein the rib members extend from the top face portion to edges and present a gap between the edges and the base portions.

8. An impact absorbing body as set forth in claim 1, wherein the base portions are disposed at a height position relative to the top face portion, and the rib members extend from the top face portion to the same height position as the base portions.

9. An impact absorbing body as set forth in claim 1, wherein a part of each of the boundary portions between adjacent sidewall portions is rounded.

10. An impact absorbing body as set forth in claim 9, wherein the rib members have a height extending from the top face portion toward the base portions, the rounded parts of the boundary portions have a height extending from the top face portion toward the base portions, and the height of the rounded parts is essentially identical to the height of the rib members.

11. An impact absorbing body as set forth in claim 1, wherein the base portions have attachment portions for attaching to the door trim in at least two places and detaching at the time of a side impact.

12. An impact absorbing body as set forth in claim 11, wherein a through hole is formed in each of the attachment portions, and a plastic pin extends through the through hole.

13. An impact absorbing body as set forth in claim 1, wherein the impact absorbing body is formed from polypropylene mixed with propylene diene monomer, polypropylene alone, or another olefinic thermoplastic elastomer.

14. An impact absorbing body as set forth in claim 1, wherein the top face portion has four linear edge portions, and including four of the sidewall portions and four of the rib members, wherein each sidewall portion extends from one of the liner edge portions and each rib member connects two of the adjacent sidewall portions.

15. An impact absorbing body as set forth in claim 14, including four of the slits, wherein each slit is disposed along one of the boundary portions between adjacent sidewall portions.

16. An impact absorbing body as set forth in claim 1, wherein the plurality of sidewall portions includes a third sidewall portion adjacent the second sidewall portion and a fourth sidewall portion between the third and first sidewall portions; the first opening has an octagonal shape; the at least two rib members includes a third rib member; the third rib member includes a first rib part extending from the third sidewall portion toward the first opening, a second rib part extending from the fourth sidewall portion toward the first opening, and a third rib part extending along the first opening and interconnecting the first and second rib parts of the third rib member, wherein the first rib part of the third rib member is spaced from the first rib part of the second rib member by a portion of the third sidewall portion; and the at least two rib members includes a fourth rib member; the fourth rib member includes a first rib part extending from the first sidewall portion toward the first opening, a second rib part extending from the fourth sidewall portion toward the first opening, and a third rib part extending along the first opening and interconnecting the first and second rib parts of the fourth rib member, wherein the first rib part of the fourth rib member is spaced from the first rib part of the first rib member by a portion of the first sidewall portion, and the second rib part of the fourth rib member is spaced from the second rib part of the third rib member by a portion of the fourth sidewall portion.

17. A vehicle interior component for an exterior panel of a vehicle, comprising:

a door trim for attachment to the exterior panel of the vehicle; and an impact absorbing body attached to the door trim for protecting a vehicle occupant, the impact absorbing body located at a part of the door trim where an occupant of the vehicle can collide at the time of a side collision;

wherein the impact absorbing body includes a top face portion for bearing the collision load from the exterior panel of the vehicle, the top face portion having at least four linear edge portions, and the top face portion presenting a first opening;

a plurality of sidewall portions extending from the linear edge portions of the top face portion to base edge portions, wherein adjacent sidewall portions present a boundary portion therebetween, wherein a plurality of the sidewall portions have slanted portions, and wherein the slanted portions are slanted outwardly;

a plurality of base portions extending outwardly from the base edge portions, the base portions surrounding a second opening facing toward the door trim, and the base portions attached to the door trim;

at least two slits, wherein each slit extends from between adjacent base portions along the boundary portion between adjacent sidewall portions toward the top face portion; and at least two rib members, wherein each rib member extends from the top face portion toward the base portions and connects adjacent sidewall portions together;

wherein a first rib member of the at least two rib members includes a first rib part extending from a first sidewall portion toward the first opening, a second rib part extending from a second sidewall portion adjacent the first sidewall portion toward the first opening, and a third rib part extending along the first opening and interconnecting the first and second rib parts of the first rib member;

wherein a second rib member of the at least two rib members includes a first rib part extending from a third sidewall portion adjacent the second sidewall portion toward the first opening, a second rib part extending from the second sidewall portion toward the first opening, and a third rib part extending along the first opening and interconnecting the first and second rib parts of the second rib member, and wherein the second rib part of the second rib member is spaced from the second rib part of the first rib member by a portion of the second sidewall portion.

18. An impact absorbing body for attachment to a door trim, comprising:

a top face portion for bearing a collision load from an exterior panel of a vehicle, the top face portion having at least four linear edge portions;

a plurality of sidewall portions extending from the linear edge portions of the top face portion to base edge portions, wherein adjacent sidewall portions present a boundary portion therebetween, wherein a plurality of the sidewall portions have first sidewall parts extending from the top face portion toward the base edge portions and slanted portions extending from the first sidewall parts toward the base edge portions, wherein the first sidewall parts are perpendicular to the top face portion and the slanted portions are slanted outwardly relative to the first sidewall parts;

a plurality of base portions extending outwardly from the base edge portions of the sidewall portions for attaching to the door trim, the base portions surrounding an opening;

at least two slits, wherein each slit extends from between adjacent base portions along the boundary portion between adjacent sidewall portions toward the top face portion; and at least two rib members, wherein each rib member extends from the top face portion toward the base portions and connects adjacent sidewall portions together.

19. An impact absorbing body as set forth in claim 18, wherein a part of each of the boundary portions extending along the first sidewall parts from the top face portion toward the base edge portions is rounded.

20. An impact absorbing body as set forth in claim 19, wherein each of the first sidewall parts has height, each of the rib members has a height, and the height of the first sidewalls parts is equal to the height of the rib members.

\* \* \* \* \*